(12) United States Patent
Davis et al.

(10) Patent No.: US 11,352,012 B1
(45) Date of Patent: Jun. 7, 2022

(54) CUSTOMIZED VEHICLE OPERATOR WORKFLOWS

(71) Applicant: Samsara Inc., San Francisco, CA (US)

(72) Inventors: Joel Davis, San Francisco, CA (US);
Sean McGee, San Francisco, CA (US);
Joy Chen, San Francisco, CA (US);
Tonia Hsia, San Francisco, CA (US);
Oliver Song, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/301,505

(22) Filed: Apr. 5, 2021

Related U.S. Application Data

(60) Provisional application No. 63/141,471, filed on Jan. 25, 2021.

(51) Int. Cl.
| | |
|---|---|
| *B60W 40/08* | (2012.01) |
| *G06F 9/30* | (2018.01) |
| *H04W 4/029* | (2018.01) |
| *H04W 4/021* | (2018.01) |

(52) U.S. Cl.
CPC ........... *B60W 40/08* (2013.01); *G06F 9/3005* (2013.01); *H04W 4/021* (2013.01); *H04W 4/029* (2018.02); *B60W 2040/0809* (2013.01)

(58) Field of Classification Search
CPC ..... G06F 9/3005; H04W 4/021; H04W 4/029; H04W 4/02; H04W 4/40; H04W 4/80; B60W 40/08; B60W 2040/0809
See application file for complete search history.

(56) References Cited

U.S. PATENT DOCUMENTS

| | | | | |
|---|---|---|---|---|
| 9,183,273 | B2 * | 11/2015 | Raghunathan | G06F 16/284 |
| 10,755,217 | B2 * | 8/2020 | Hirschfeld | H04L 67/10 |
| 10,810,530 | B2 * | 10/2020 | Geisler | G06Q 10/0633 |
| 10,841,733 | B1 * | 11/2020 | Sailer | H04W 4/44 |
| 2006/0074707 | A1 * | 4/2006 | Schuette | G06Q 10/087 705/28 |
| 2014/0087772 | A1 * | 3/2014 | Papa | G06Q 50/28 455/466 |
| 2014/0108080 | A1 * | 4/2014 | Mitchell | G06Q 10/06 705/7.15 |
| 2014/0226010 | A1 * | 8/2014 | Molin | G07C 5/008 348/148 |
| 2015/0302323 | A1 * | 10/2015 | Connolly | G06Q 10/0633 705/7.27 |
| 2015/0355889 | A1 * | 12/2015 | Kilby | G06F 8/38 705/4 |
| 2016/0092805 | A1 * | 3/2016 | Geisler | G06Q 10/08 705/7.27 |
| 2016/0300242 | A1 * | 10/2016 | Truong | G06V 20/59 |

(Continued)

*Primary Examiner* — Luis A Martinez Borrero
(74) *Attorney, Agent, or Firm* — Schwegman Lundberg & Woessner, P.A.

(57) ABSTRACT

Disclosed are systems, methods, and non-transitory computer-readable media for customized vehicle operator workflows. A vehicle operator workflow includes a set of tasks to be completed by a vehicle operator. The vehicle operator workflow may be presented to the vehicle operator upon satisfaction of a triggering event, such as upon the vehicle operator logging into an account or the vehicle entering a specified geographic region. The vehicle operator workflow may enable the vehicle operator to complete the individual tasks as well as submit evidence that the tasks have been completed.

20 Claims, 17 Drawing Sheets

(56) References Cited

U.S. PATENT DOCUMENTS

| | | | |
|---|---|---|---|
| 2017/0039890 A1* | 2/2017 | Truong | G07C 5/08 |
| 2017/0053647 A1* | 2/2017 | Nichols | G10L 15/22 |
| 2017/0131711 A1* | 5/2017 | Thomson | G05D 1/0005 |
| 2018/0096588 A1* | 4/2018 | Shabah | H04B 7/18504 |
| 2018/0218320 A1* | 8/2018 | Lee | G06K 17/0022 |
| 2018/0341533 A1* | 11/2018 | Shanbhag | G06F 9/451 |
| 2019/0066033 A1* | 2/2019 | Mains, Jr | G06Q 10/083 |
| 2019/0066042 A1* | 2/2019 | Conlon | G06Q 10/0833 |
| 2019/0102146 A1* | 4/2019 | Swift | G06F 3/0482 |
| 2019/0107834 A1* | 4/2019 | Ravindranath | G05D 1/0022 |
| 2019/0227569 A1* | 7/2019 | Weslosky | G07C 5/008 |
| 2019/0236514 A1* | 8/2019 | Schubert | G06Q 10/063114 |
| 2019/0384842 A1* | 12/2019 | Rao | G06F 16/27 |
| 2020/0151676 A1* | 5/2020 | Mitchell | G06Q 10/20 |
| 2020/0344824 A1* | 10/2020 | Kennedy | H04W 76/19 |
| 2020/0349496 A1* | 11/2020 | Irwin | G06Q 10/0631 |
| 2021/0042724 A1* | 2/2021 | Rathod | H04W 4/029 |
| 2021/0082220 A1* | 3/2021 | Boerger | G06Q 10/083 |
| 2021/0116938 A1* | 4/2021 | Sun | G06F 16/22 |
| 2021/0182870 A1* | 6/2021 | Degeneffe | G06Q 10/06311 |

* cited by examiner

700

Driver App

General  Features  Workflows

Sign In
Triggered when drivers login to the app

Sign In  ···
Published to 28 drivers
⏚—🚚—🕐—🚚—+3

— 704

Stop Arrival
Triggered when drivers arrive at stops along their routes

Submit Document ···
Not published

Drop & Hook ···
Not published

CUSTOMIZED VEHICLE OPERATOR WORKFLOWS

CROSS-REFERENCE TO RELATED APPLICATIONS

This patent application claims the benefit of U.S. Provisional Patent Application No. 63/141,471, filed Jan. 25, 2021, which is incorporated in its entirety by reference.

TECHNICAL FIELD

Embodiments of the present subject matter relate generally to vehicles and, more specifically, to customized vehicle operator workflows.

BACKGROUND

Shipping providers user a variety of vehicles, such as semi-trailer trucks, planes, trains and ships, to transport items worldwide. To manage these items, shipping providers may ask the vehicle operators to perform specified tasks to comply with local regulations, track assets, and the like. This process poses challenges as the vehicles are often travelling through various geographic regions with different laws and regulations that may change over time. Generating task lists for each vehicle operator, modifying the tasks lists, and collected data associated with completing the tasks is therefore difficult and time consuming. Accordingly, improvements are needed.

BRIEF DESCRIPTION OF THE DRAWINGS

To easily identify the discussion of any particular element or act, the most significant digit or digits in a reference number refer to the figure number in which that element is first introduced.

FIGS. 7A-7C show a user interface for generating a vehicle operator workflow, according to some example embodiments.

DETAILED DESCRIPTION

Figure 1:
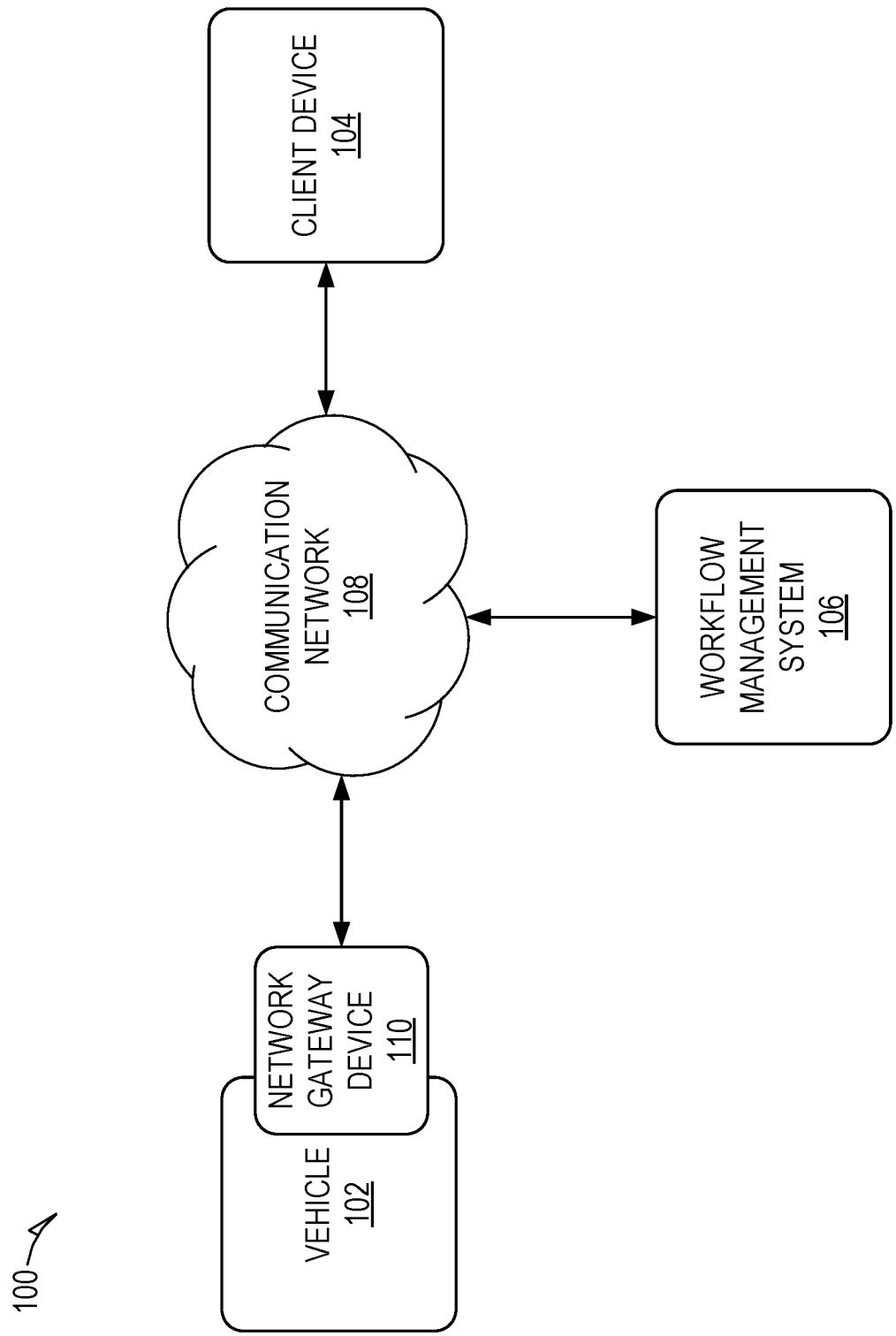
FIG. 1 shows a system for providing customized vehicle operator workflows, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for customized vehicle operator workflows. A workflow management system allows for generation and management of customized vehicle operator workflows. For example, the workflow management system may provide a user interface that allows administrators to generate the vehicle operator workflows for individual vehicle operators, groups of vehicle operators, and the like. A vehicle operator workflow designates a list of tasks to be completed by an operator of a vehicle. For example, the vehicle operator workflow may include individual tasks such as performing individual safety checks, performing inventory, and the like.

The workflow management system provides the generated vehicle operator workflows to the appropriate vehicle operators. For example, the workflow management system may provide the vehicle operator workflows to client devices of the vehicle operators, where the vehicle operator workflows are presented to the vehicle operators. A vehicle operator workflow may be associated with a triggering condition dictating when the vehicle operator workflow is to be presented to the vehicle operator. For example, a vehicle operator workflow may be associated with a triggering condition such as logging into an account, reaching a geographic endpoint, logging out of an account, and the like. Accordingly, the vehicle operator workflow will be presented to the vehicle operator upon satisfaction of the corresponding triggering condition.

The vehicle operator workflow may also enable a vehicle operator to complete the individual tasks and/or provide evidence that a task has been completed. For example, the vehicle operator workflow may cause execution of third-party applications that enable the vehicle operator to complete a task, such as entering an odometer reading, providing specified data, and the like. As another example, the vehicle operator workflow may enable the vehicle operator to submit content items providing evidence that a task has been completed. For example, the vehicle operator may capture a photograph indicating that a task such as washing a vehicle has been completed.

FIG. 1 shows a system 100 for providing customized vehicle operator workflows. As shown, multiple devices (i.e., vehicle 102, client device 104, and workflow management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1000 shown in FIG. 10.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, semi-trailer truck, plane, train, ship, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs), actuators, etc., deployed within the vehicle. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture data describing performance of a vehicle and its surroundings. For example, the sensors may include engine speed sensors, fuel temperature sensors, voltage sensors, pressure sensors, radar sensors, light detection and ranking (LIDAR) sensors, imaging sensors (e.g., camera, video camera), and the like.

The workflow management system 106 is one or more computing devices that allow for generation and management of customized vehicle operator workflows. For example, the workflow management system 106 may allow administrators to generate vehicle operator workflows for individual vehicle operators, groups of vehicle operators, and the like. The workflow management system 106 may also enable vehicle operators to access and interact with the customized vehicle operator workflows.

To utilize the functionality of the workflow management system 106, users (e.g., administrators, vehicle operators) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles. Further, the workflow management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, tablets; smart televisions; set-top boxes; and/or any other network enabled computing devices. Hence, the client devices 104 may be of varying type, capabilities, operating systems, and so forth.

A user interacts with a workflow management system 106 via a client-side application installed on the client device 104. In some embodiments, the client-side application includes a component specific to the workflow management system 106. For example, the component may be a stand-alone application, one or more application plug-ins, and/or a browser extension. However, the users may also interact with the workflow management system 106 via a third-party application, such as a web browser or messaging application, that resides on the client device 104 and is configured to communicate with the workflow management system 106. In either case, the client-side application presents a user interface (UI) for the user to interact with the workflow management system 106. For example, the user interacts with the workflow management system 106 via a client-side application integrated with the file system or via a webpage displayed using a web browser application.

As discussed earlier, the workflow management system 106 enables administrators to generate and/or modify customized vehicle operator workflows. For example, the workflow management system 106 may provide a user interface that allows administrators to generate the vehicle operator workflows. A vehicle operator workflow designates a list of tasks to be completed by an operator of a vehicle. For example, the vehicle operator workflow may include individual tasks such as performing individual safety checks, performing inventory, and the like.

The user interface provided by the workflow management system 106 enables administrators to define the individual tasks to be included in a vehicle operator workflow. For example, the user interface may provide a listing of pre-defined tasks that an administrator may select from to include in the vehicle operator workflow. An administrator may use the user interface to select from the listed individual tasks to be included in the vehicle operator workflow, as well as select an order in which the tasks are listed in the vehicle operator workflow. In some embodiments, the user interface may also enable an administrator to customize each selected task by modifying various attributes of the task. For example, the predefined tasks may have various configurable attributes, such as a phone number, email address, description field, etc., that an administrator may define to customize the task as desired.

In some embodiments, the user interface may enable an administrator to generate a completely new task. For example, the user interface may enable the administrator to add and configure various attributes for the new task, such as by defining a task title, adding images, providing a description of the task and the like.

The user interface may also enable an administrator to define an individual vehicle operator or group/category of vehicle operators to receive the vehicle operator workflow. For example, the user interface may present a listing of individual vehicle operators and/or groups/categories of vehicle operators from which an administrator may select. As another example, the user interface may enable an administrator to enter data identifying a vehicle operator and/or enter a new vehicle operator.

Each vehicle operator workflow may be associated with a triggering condition that dictates when the vehicle operator workflow is to be presented to the vehicle operator. For example, a vehicle operator workflow may be associated with a triggering condition such as the vehicle operator logging into an account, reaching a geographic endpoint, logging out of an account, and the like. Accordingly, the user interface provided by the workflow management system 106 may enable an administrator to define the triggering condition for the vehicle operator workflow. The triggering condition may include a single condition or a set of conditions. In any case, the administrator may use the user interface to define the individual conditions and select from predefined conditions provided by the workflow management system 106.

The workflow management system 106 may distribute the vehicle operator workflows to the appropriate vehicle operators. For example, the workflow management system 106 may cause the vehicle operator workflow to be presented to a vehicle operator within a user interface of a client-side application executing on the client device 104. As another example, the workflow management system 106 may transmit a push notification to the client device 104 indicating that the vehicle operator workflow has been transmitted to the vehicle operator. The push notification may include a user interface element, such as a button, that enables the vehicle operator to cause presentation of the vehicle operator workflow.

The vehicle operators workflows may be presented to the vehicle operator based on satisfaction of the triggering condition associated with the vehicle operator workflow. For example, the workflow management system 106 and/or the client device 104 of the vehicle operator may determine whether a triggering condition associated with a vehicle operator workflow has been satisfied, and if so, cause presentation of the corresponding vehicle operator workflow.

The triggering condition may be one or more individual conditions and may be any of a variety of types of conditions. For example, a triggering condition may be based on a temporal condition, such as a triggering at a specified time (e.g., scheduled start time, scheduled end time, etc.). As another example, a triggering condition may be based on the vehicle operator logging into or requesting to log out of their account. As another example, a triggering condition may be based on a geographic location of the vehicle operators, such as the vehicle operator being within a predefined geofence, crossing a geographic threshold (e.g., state line), and the like. These are just a few examples and are not meant to be limiting.

The workflow management system 106 and/or the client device 104 may determine whether a triggering condition has been satisfied based on various data inputs, such as sensor data gathered by sensors of the client device 104, sensor data gathered by sensors of the vehicle 102, data input received via a client-side application executing on the client device 104, internal clocks, and the like. For example, the workflow management system 106 and/or the client device 104 may determine whether a geographic based triggering condition has been satisfied based on sensor data captured by sensors of vehicle 102 and/or sensors of the client device 104 that indicate the geographic location of each (e.g., global positioning system (GPS) data). As another example, the workflow management system 106 and/or the client device 104 can determine if a login or log out triggering condition has been satisfied based on received input via the client-side application on the client device 104.

The vehicle operator workflow presented to the vehicle operator may list the individual tasks to be performed by the vehicle operator. Optionally, the individual tasks may be presented in an order in which the vehicle operator is to complete the individual tasks. The vehicle operator workflow may also enable a vehicle operator to complete the individual tasks and/or provide evidence that a task has been completed. For example, the vehicle operator workflow may cause execution of third-party applications on the client device 104 that enable the vehicle operator to complete a task, such as entering an odometer reading, providing specified data, and the like. Execution of a third-party application may be caused using a deep-link that may also direct the third-party application into a specified state, such as a state in which the vehicle operator may enter the needed information.

As another example, the vehicle operator workflow may enable the vehicle operator to submit content items providing evidence that a task has been completed. For example, the vehicle operator may use optical sensors of the client device 104 to capture a photograph indicating that a task, such as washing a vehicle has been completed. As another example, the vehicle operator workflow may enable the vehicle operator to enter and submit information, such as an odometer reading, inventory list, etc., which is then compiled into a content item file providing evidence that a task has been completed.

The content items providing evidence may be transmitted to the workflow management system 106. The workflow management system 106 may use store the content items for later use. The workflow management system 106 may also generate reports based on the received content items, which can then be accessed by an administrator or other user.

Figure 2:
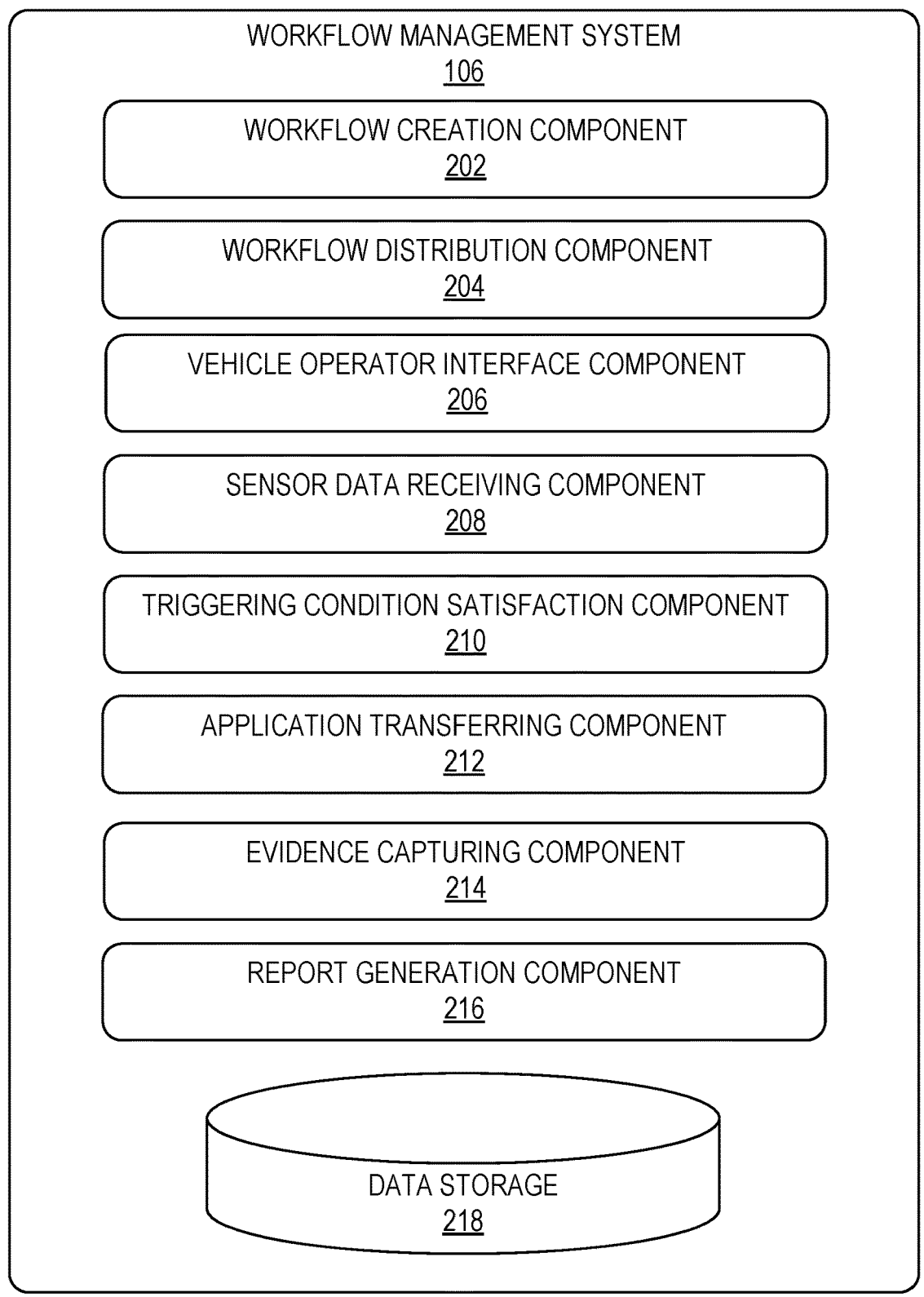
FIG. 2 is a block diagram of the workflow management system, according to some example embodiments.

FIG. 2 is a block diagram of the workflow management system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the workflow management system 106 to facilitate additional functionality that is not specifically described herein. Furthermore, the various functional components depicted in FIG. 2 may reside on a single computing device or may be distributed across several computing devices in various arrangements such as those used in cloud-based architectures. For example, in some embodiments the functional components may reside partially on the workflow management system 106 and the client device 104. Accordingly, some or all of the functionality described may be performed by the workflow management system 106 and the client device 104.

As shown, the workflow management system 106 includes a workflow creation component 202, a workflow distribution component 204, a vehicle operator interface component 206, a sensor data receiving component 208, a triggering condition satisfaction component 210, an application transferring component 212, an evidence capturing component 214, a report generation component 216, and a data storage 218.

The workflow creation component 202 provides functionality that enables administrators to generate and manage vehicle operator workflows. For example, the workflow creation component 202 provides a user interface that an administrator may use to generate and manage vehicle operator workflows. An administrator is a user that is authorized to utilize the functionality of the workflow management system 106 to create and manage the vehicle operator workflows. For example, an administrator may be a customer of the workflow management system 106, or employee of the customer, that has been designated to manage the vehicle operator workflows for the customer.

The user interface provided by the workflow creation component 202 enables administrators to define the individual tasks to be included in a vehicle operator workflow. For example, the user interface may provide a listing of predefined tasks that an administrator may select from to include in the vehicle operator workflow. The workflow creation component 202 may access the listing of predefined tasks from the data storage 218, where they may then be presented within the user interface. An administrator may use the user interface to select from the listed individual tasks to be included in the vehicle operator workflow, as well as select an order in which the tasks are listed in the vehicle operator workflow.

In some embodiments, the user interface may also enable an administrator to customize each selected task by modifying various attributes of the task. For example, the predefined tasks may have various configurable attributes, such as a phone number, email address, description field, etc., that an administrator may define to customize the task as desired. The workflow creation component 202 may store the attributes provided by the administrator in the data storage 218.

In some embodiments, the user interface may enable an administrator to generate a completely new task. For example, the user interface may enable the administrator to add and configure various attributes for the new task, such as by defining a task title, adding images, providing a description of the task and the like. The workflow creation component 202 stores the newly created task in the data storage 218, where it is associated with the vehicle operator workflow. The newly generated task may also be accessed from the data storage 218 when presenting a listing of predefined tasks to an administrator that is creating a vehicle operator workflow.

The user interface may also enable an administrator to define an individual vehicle operator or group/category of vehicle operators to receive the vehicle operator workflow. For example, the user interface may present a listing of individual vehicle operators and/or groups/categories of vehicle operators. The administrator may select from the listed vehicle operators or groups/categories of vehicle operators to assign the vehicle operator workflow to the vehicle operators. As another example, the user interface may enable an administrator to enter data identifying a vehicle operator and/or enter a new vehicle operator.

Each vehicle operator workflow may be associated with a triggering condition that dictates when the vehicle operator workflow is to be presented to the vehicle operator. For example, a vehicle operator workflow may be associated with a triggering condition such as the vehicle operator logging into an account, reaching a geographic endpoint, logging out of an account, and the like. Accordingly, the user interface provided by the workflow creation component 202 may enable an administrator to define the triggering condition for the vehicle operator workflow. The triggering condition may include a single condition or a set of conditions. In any case, the administrator may use the user interface to define the individual conditions and select from predefined conditions provided by the workflow creation component 202.

The workflow creation component 202 may store data defining newly created vehicle operator workflows in the data storage 218, where they can be accessed by the various components of the workflow management system 106. The vehicle operator workflows may be stored with metadata describing the customer or customer account associated with the vehicle operator workflows. The vehicle operator workflows may also be associated with data identifying the vehicle operators and/or groups of vehicle operators to which the vehicle operator workflows are assigned.

The workflow distribution component 204 distributes the vehicle operator workflows to the assigned vehicle operators to which they are assigned. For example, the workflow creation component 202 may transmit the workflows to client devices 104 associated with the vehicle operators to which the vehicle operator workflows are assigned. A client device 104 associated with a vehicle operator may include a client device 104 that the vehicle operator uses to login to their account with the workflow management system 106. As another example, a client device 104 associated with a vehicle operator may include a client device 104 that is a know client device 104 of the vehicle operator. For example, a record of the client devices 104 assigned to the vehicle operators may be stored in the data storage 218. The workflow distribution component 204 may search the record for a specified vehicle operator to identify the client device 104 associated with the vehicle operator.

Distributing the vehicle operator workflow to a client device 104 may include transmitting data defining the vehicle operator workflow to the client device 104. The data defining the vehicle operator workflow may include data identifying the individual tasks, triggering conditions, instructions for completion of tasks, deep links to third-party applications, and the like.

In some embodiments, distributing the vehicle operator workflow to a client device 104 may cause immediate presentation of the vehicle operator workflow to the vehicle operator, however this is not always the case. For example, an administrator may select to have the vehicle operator workflow presented to vehicle operator upon distribution. In this type of embodiment, the client device 104 may cause presentation of the vehicle operator workflow once it has been received from the workflow management system 106.

Alternatively, the administrator may select that the vehicle operator workflow be presented to the vehicle operator upon satisfaction of a specified triggering condition. In this type of situation, the vehicle operator workflow distributed to the client device 104 is not presented until the triggering condition is satisfied, which may occur at a later time or not at all.

The workflow distribution component 204 may distribute multiple vehicle operator workflows to a single vehicle operator. For example, the vehicle operator may be assigned with various workflows that are associated with different triggering conditions, such as the vehicle operator logging in/out of an account, temporal conditions set at various times, geographic conditions associated with different checkpoint along a route designated to the vehicle operator, and the like.

The vehicle operator interface component 206 facilitates presentation of the vehicle operator workflow to a vehicle operator. For example, the vehicle operator interface component 206 provides a user interface on the client device 104 of the vehicle operator. The user interface provided by the vehicle operator interface component 206 presents vehicle operator workflows to the vehicle operator. For example, the user interface may present a listing of the individual tasks included in the vehicle operator workflow. Each listed individual task may include data describing the individual task, such as a title, description, instructions for completing the task, and the like.

The user interface may also enable a vehicle operator to complete the task and/or submit evidence indicating that a task has been completed. For example, the user interface may include user interface elements, such as text boxes, buttons, and the like, that the vehicle operator may use to complete the listed tasks. This may include entering specified data, initiating a third-party application, capturing images, initiating a communication (e.g., phone call, text message) to a designated party, and the like. The user interface may also include user interface elements enabling a vehicle operator to mark a task as being completed. For example, the user interface may include a button that the vehicle operator selects to mark a task as being completed.

The vehicle operator interface component 206 may update the user interface to indicate the status of the individual tasks included in a vehicle operator workflow and/or the status of the vehicle operator workflow overall. For example, the user interface may be updated to indicate that individual tasks and/or all of the tasks in the vehicle operator workflow have been completed, the time of completion, whether evidence has been submitted, and the like. Data and/or evidence submitted using the user interface may be used to generate reports, as is discussed in greater detail below.

The sensor data receiving component 208 receives sensor data from the client device 104 and/or vehicle 102. The vehicle 102 and the client device 104 may be equipped with a variety of sensors that capture data describing the performance of the vehicle 102 and/or its current surroundings. For example, the sensors may include engine speed sensors, fuel temperature sensors, voltage sensors, pressure sensors, radar sensors, light detection and ranking (LIDAR) sensors, imaging sensors (e.g., camera, video camera), location sensors (e.g., GPS sensors), and the like. The sensor data may also data describing the current operator of the vehicle 102, such as an identifier identifying the operator, a blood alcohol level of the operator, eye gaze of the operator, etc. These are just some examples of the types of sensor data that may be received by the sensor data receiving component 208 and are not meant to be limiting.

The sensor data receiving component 208 may provide the received sensor data to other components of the workflow management system 106 and/or store the sensor data in the data storage 218. The sensor data stored in the data storage 218 may be associated with the vehicle 102, client device 104 and/or vehicle operator from which the sensor data was received or describes. For example, the sensor data may be associated with a unique identifier associated with the vehicle 102, client device 104, and/or vehicle operator.

The triggering condition satisfaction component 210 determines whether a triggering condition associated with a vehicle operator workflow has been satisfied. The triggering condition satisfaction component 210 may determine whether a triggering condition has been satisfied based on a variety of data inputs, including usage of the client device 104 by the vehicle operator, internal clocks, sensor data gathered by the sensor data receiving component 208, and the like. A triggering condition may be based on a vehicle operator's usage of the client device 104, such as the vehicle operator attempting to login or logoff. The triggering condition satisfaction component 210 may monitor the vehicle operator's usage of the client device 104, such as by determining whether the vehicle operator as logged into an account or requested to log out to determine whether a triggering condition has been satisfied.

As another example, a triggering condition may be based on a temporal condition, such as triggering at a specified time. Accordingly, the triggering condition satisfaction component 210 may use an internal clock to monitor the time and determine whether a triggering condition has been satisfied.

As another example, a triggering condition may be based on a geographic condition, such as a vehicle 102 and/or vehicle operator entering a specified geographic region or crossing a geographic threshold. For example, the triggering condition may be based on a vehicle 102 and/or vehicle operator entering a checkpoint along a specified route or crossing a geographic threshold such as a state or national border. The triggering condition satisfaction component 210 may use sensor data describing the geographic location of the vehicle 102 and/or vehicle operator to determine whether this type of triggering condition has been satisfied.

As another example, a triggering condition may be based on performance of the vehicle 102. For example, a triggering condition may be based on a detected failure or error by the vehicle 102, a detected accident or collision by the vehicle 102, a speed of the vehicle 102 surpassing a threshold speed, a detected erratic movement of the vehicle 102, and the like. In these types of situations, the triggering condition satisfaction component 210 may use sensor data describing performance of the vehicle 102 and/or the components within the vehicle 102 to determine whether a triggering condition has been satisfied.

These are just a few examples of the types of triggering conditions and are not meant to limiting. The workflow management system 106 may use any of a variety of types of triggering conditions as well as any combination of individual triggering conditions.

Upon determining that a triggering condition has been satisfied, the triggering condition satisfaction component 210 may cause the vehicle operator workflow to be presented to the vehicle operator. For example, the triggering condition satisfaction component 210 may communicate with the vehicle operator interface component 206 to cause the vehicle operator workflow to be presented. This communication may include data identifying the vehicle operator, client device 104, and/or vehicle 102 as well as the vehicle operator workflow to be presented.

The application transferring component 212 facilitates transferring of operation to a third-party application for purposes of completing a task included in a vehicle operator workflow. A task included in a vehicle operator workflow may involve the use of a third-party application, such as using the third-party application to enter specified data, capture an image, etc. The application transferring component 212 may facilitate automated operational transfer of the client device 104 to the third-party application to complete the task. For example, the vehicle operator workflow presented by the client device 104 may include a user interface element, such as a button or link, which the vehicle operator may select to perform a task involving the use of a third-party application. Upon detecting selection of the user interface element, the application transferring component 212 may cause execution and/or transfer of the operation to the third-party application. For example, the application transferring component 212 may execute a deep link to the third-party application. The deep link may configure the third-party application into a particular state such as by initiating a particular state in which the vehicle operator may enter required data as well as populating one or more fields. Upon determining that a vehicle operator has completed the task using the third-party application, the application transferring component 212 may transfer operation back to the user interface provided by the vehicle operator interface component 206.

The evidence capturing component 214 enables vehicle operators to capture and submit content items that provide evidence that a task or tasks withing a vehicle operator interface have been completed. For example, the evidence capturing component 214 may enable the vehicle operator to capture an image, video and/or audio using sensors of the client device 104. The captured content item (e.g., image, video and/or audio) may provide evidence that the vehicle operator has completed a task, such cleaning the vehicle 102, delivering cargo, and the like. Similarly, the evidence capturing component 214 may provide user interface elements that enable the vehicle driver to enter data that the evidence capturing component 214 uses to generate a content item, such as a text file.

The report generation component 216 generates a report associated with a vehicle operator workflow. For example, the report may include data describing performance of the individual tasks included in the vehicle operator workflow, such as whether the task was marked as completed, a date/time at which each task was completed (e.g., marked as completed), content items providing evidence that the task was completed, data entered by a vehicle operator, and the like. The report generation component 216 may receive the data used to generate the report from the client device 104 and/or a third-party application. The report generation component 216 may store the generated report on the data storage 218 and/or submit the report to one or more recipients. For example, the report generation component 216 may transmit the report to an administrator or other user.

Figure 3:
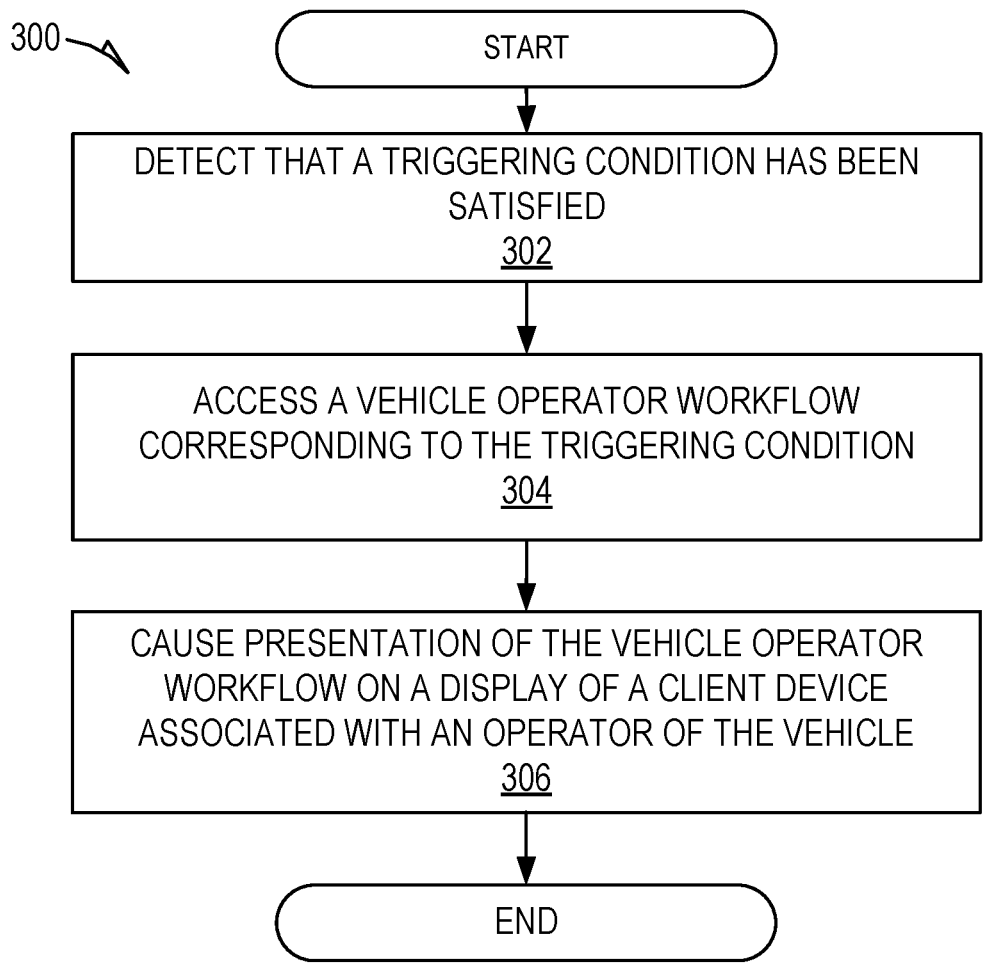
FIG. 3 is a flowchart showing a method for customized vehicle operator workflows, according to some example embodiments.

FIG. 3 is a flowchart showing a method 300 for customized vehicle operator workflows, according to some example embodiments. The method 300 may be embodied in computer readable instructions for execution by one or more processors such that the operations of the method 300 may be performed in part or in whole by the workflow management system 106; accordingly, the method 300 is described below by way of example with reference thereto. However, it shall be appreciated that at least some of the operations of the method 300 may be deployed on various other hardware configurations and the method 300 is not intended to be limited to the workflow management system 106. For example, the method 300 may be performed by the workflow management system 106 and/or the client device 104.

At operation 302, the triggering condition satisfaction component 210 detects that a triggering condition has been satisfied. The triggering condition satisfaction component 210 determines whether a triggering condition associated with a vehicle operator workflow has been satisfied. The triggering condition satisfaction component 210 may determine whether a triggering condition has been satisfied based on a variety of data inputs, including usage of the client device 104 by the vehicle operator, internal clocks, sensor data gathered by the sensor data receiving component 208, and the like.

At operation 304, the vehicle operator interface component 206 accesses a vehicle operator workflow corresponding to the triggering condition. For example, the vehicle operator interface component 206 may access the vehicle operator workflow from the data storage 218.

At operation 306, the vehicle operator interface component 206 causes presentation of the vehicle operator workflow on a display of a client device 104 associated with an operator of the vehicle 102. The vehicle operator interface component 206 facilitates presentation of the vehicle operator workflow to a vehicle operator. For example, the vehicle operator interface component 206 provides a user interface on the client device 104 of the vehicle operator. The user interface provided by the vehicle operator interface component 206 presents vehicle operator workflows to the vehicle operator. For example, the user interface may present a listing of the individual tasks included in the vehicle operator workflow. Each listed individual task may include data describing the individual task, such as a title, description, instructions for completing the task, and the like.

The user interface may also enable a vehicle operator to complete the task and/or submit evidence indicating that a task has been completed. For example, the user interface may include user interface elements, such as text boxes, buttons, and the like, that the vehicle operator may use to complete the listed tasks. This may include entering specified data, initiating a third-party application, capturing images, initiating a communication (e.g., phone call, text message) to a designated party, and the like. The user interface may also include user interface elements enabling a vehicle operator to mark a task as being completed. For example, the user interface may include a button that the vehicle operator selects to mark a task as being completed.

The vehicle operator interface component 206 may update the user interface to indicate the status of the individual tasks included in a vehicle operator workflow and/or the status of the vehicle operator workflow overall. For example, the user interface may be updated to indicate that individual tasks and/or all of the tasks in the vehicle operator workflow have been completed, the time of completion, whether evidence has been submitted, and the like. Data and/or evidence submitted using the user interface may be used to generate reports, as is discussed in greater detail below.

Figure 4:
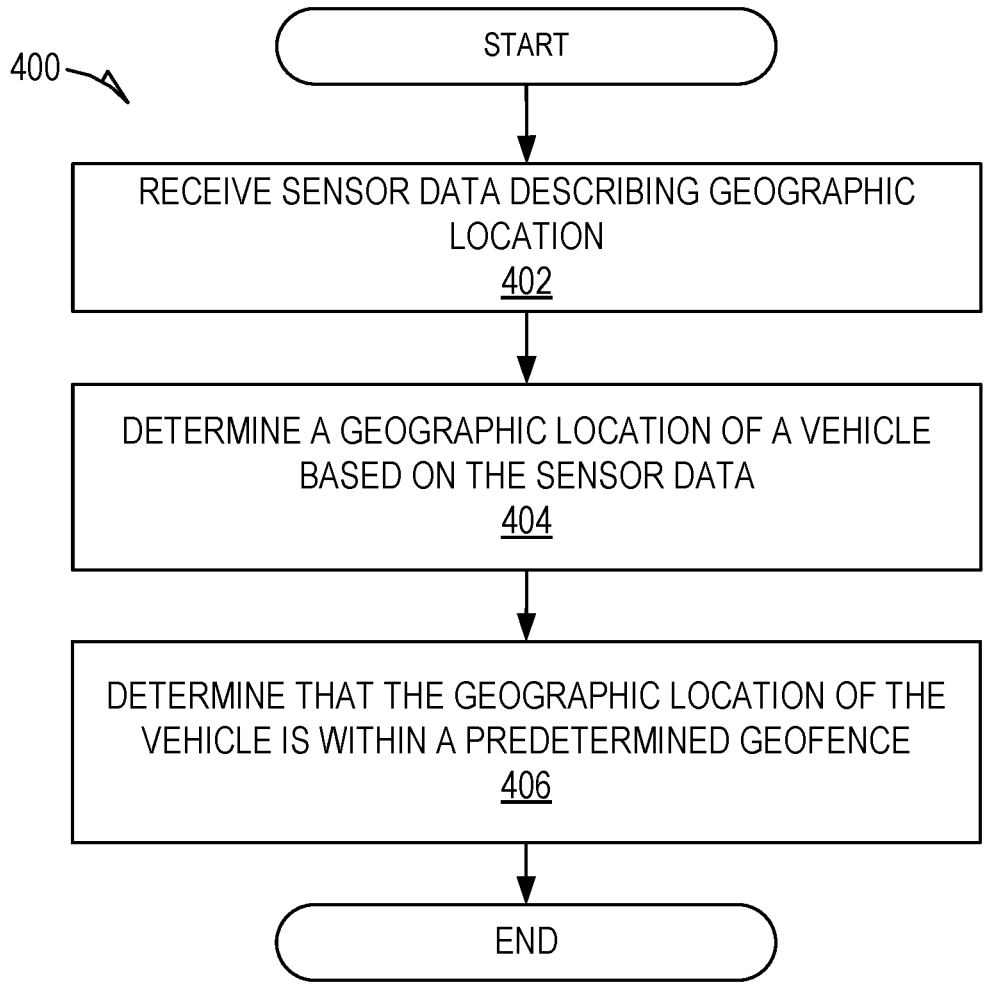
FIG. 4 is a flowchart showing a method for determining that a triggering condition has been satisfied, according to some example embodiments.

FIG. 4 is a flowchart showing a method 400 for determining that a triggering condition has been satisfied, according to some example embodiments. The method 400 may be embodied in computer readable instructions for execution by one or more processors such that the operations of the method 400 may be performed in part or in whole by the workflow management system 106; accordingly, the method 400 is described below by way of example with reference thereto. However, it shall be appreciated that at least some of the operations of the method 400 may be deployed on various other hardware configurations and the method 400 is not intended to be limited to the workflow management system 106. For example, the method 400 may be performed by the workflow management system 106 and/or the client device 104.

At operation 402, the sensor data receiving component 208 receives sensor data describing geographic location. The sensor data receiving component 208 receives sensor data from the client device 104 and/or vehicle 102. The vehicle 102 and the client device 104 may be equipped with a variety of sensors that capture data describing the performance of the vehicle 102 and/or its current surroundings. For example, the sensors may include engine speed sensors, fuel temperature sensors, voltage sensors, pressure sensors, radar sensors, light detection and ranking (LIDAR) sensors, imaging sensors (e.g., camera, video camera), location sensors (e.g., GPS sensors), and the like.

At operation 404, the triggering condition satisfaction component 210 determines a geographic location of a vehicle based on the sensor data. The triggering condition satisfaction component 210 determines whether a triggering condition associated with a vehicle operator workflow has been satisfied. A triggering condition may be based on a geographic condition, such as a vehicle 102 and/or vehicle operator entering a specified geographic region or crossing a geographic threshold. The triggering condition satisfaction component 210 may use sensor data describing the geographic location of the vehicle 102 and/or vehicle operator to determine whether the triggering condition has been satisfied. Accordingly, at operation 406, the triggering condition satisfaction component 210 determines that the geographic location of the vehicle is within a predetermined geofence.

Figure 5:
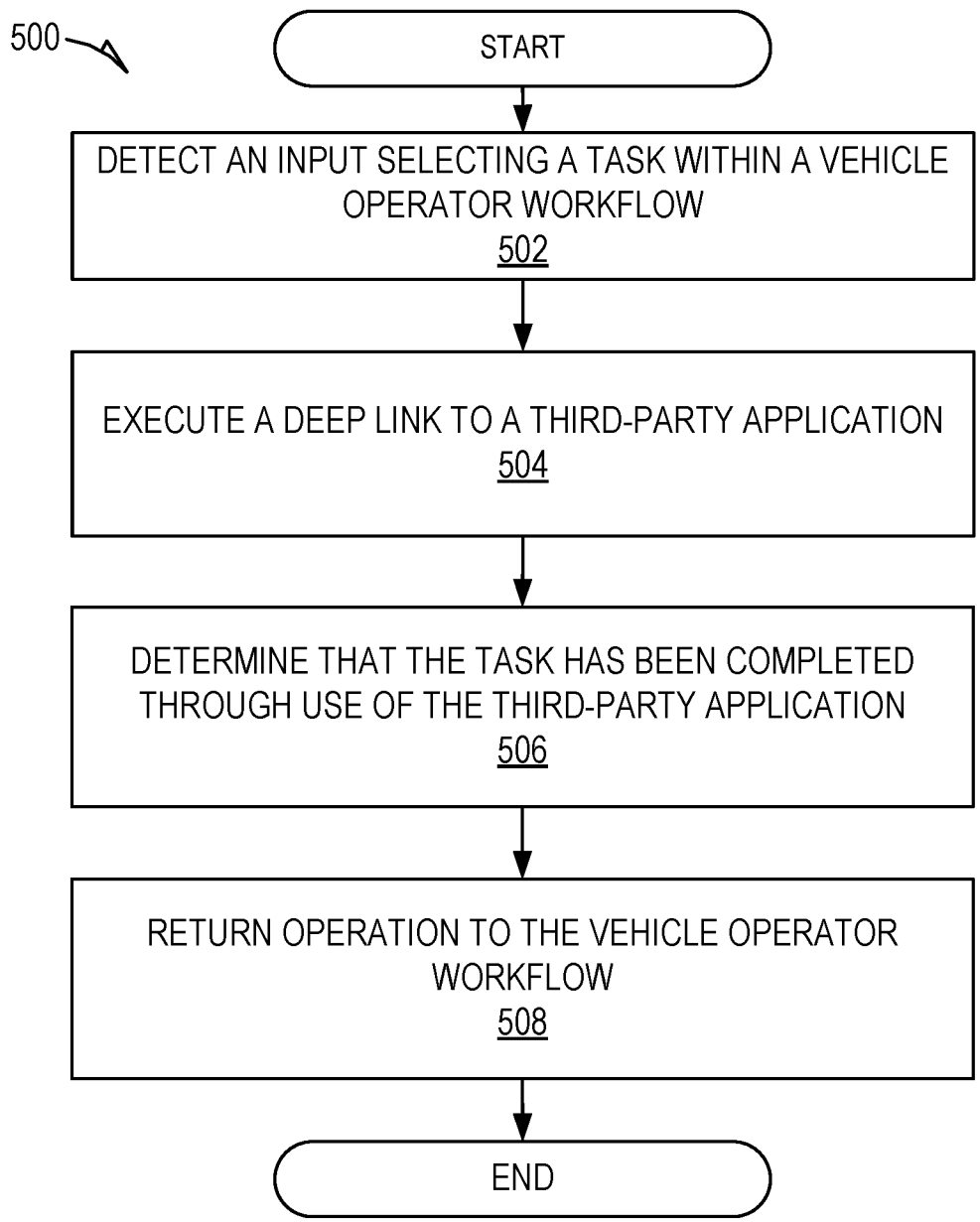
FIG. 5 is a flowchart showing a method for enabling a vehicle operator to complete a task via a third-party application, according to some example embodiments.

FIG. 5 is a flowchart showing a method 500 for enabling a vehicle operator to complete a task via a third-party application, according to some example embodiments. The method 500 may be embodied in computer readable instructions for execution by one or more processors such that the operations of the method 500 may be performed in part or in whole by the workflow management system 106; accordingly, the method 500 is described below by way of example with reference thereto. However, it shall be appreciated that at least some of the operations of the method 500 may be deployed on various other hardware configurations and the method 500 is not intended to be limited to the workflow management system 106. For example, the method 500 may be performed by the workflow management system 106 and/or the client device 104.

At operation 502, the application transferring component 212 detects an input selecting a task within a vehicle operator workflow. The application transferring component 212 facilitates transferring of operation to a third-party application for purposes of completing a task included in a vehicle operator workflow. A task included in a vehicle operator workflow may involve the use of a third-party application, such as using the third-party application to enter specified data, capture an image, etc.

At operation 504, the application transferring component 212 executes a deep link to a third-party application. The deep link may configure the third-party application into a particular state such as by initiating a particular state in which the vehicle operator may enter required data as well as populating one or more fields.

At operation 506, the application transferring component 212 determines that the task has been completed through use of the third-party application. Upon determining that a vehicle operator has completed the task using the third-party application, at operation 508, the application transferring component 212 returns operation to the vehicle operator workflow.

Figure 6:
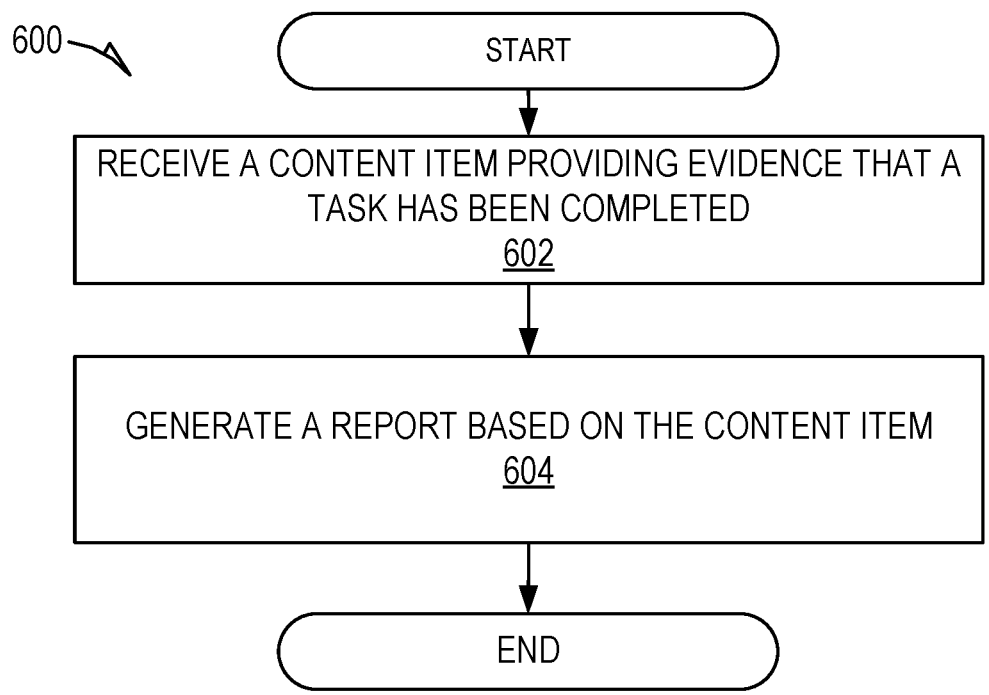
FIG. 6 is a flowchart showing a method for generating a report for a vehicle operator workflow, according to some example embodiments.

FIG. 6 is a flowchart showing a method 600 for generating a report for a vehicle operator workflow, according to some example embodiments. The method 600 may be embodied in computer readable instructions for execution by one or more processors such that the operations of the method 600 may be performed in part or in whole by the workflow management system 106; accordingly, the method 600 is described below by way of example with reference thereto. However, it shall be appreciated that at least some of the operations of the method 600 may be deployed on various other hardware configurations and the method 600 is not intended to be limited to the workflow management system 106. For example, the method 600 may be performed by the workflow management system 106 and/or the client device 104.

At operation 602, the report generation component 216 receives a content item providing evidence that a task has been completed. The content item may be an image, video and/or audio captured by a vehicle operator to provide evidence that a task has been completed. The content item may also be text entered by the vehicle operator indicating that the task has been completed. The report generation component 216 may receive the content item from the client device 104 and/or a third-party application.

At operation 604, the report generation component 216 generates a report based on the content item. For example, the report may include data describing performance of the individual tasks included in the vehicle operator workflow, such as whether the task was marked as completed, a date/time at which each task was completed (e.g., marked as completed), content items providing evidence that the task was completed, data entered by a vehicle operator, and the like. The report generation component 216 may store the generated report on the data storage 218 and/or submit the report to one or more recipients. For example, the report generation component 216 may transmit the report to an administrator or other user.

Figure 7A:
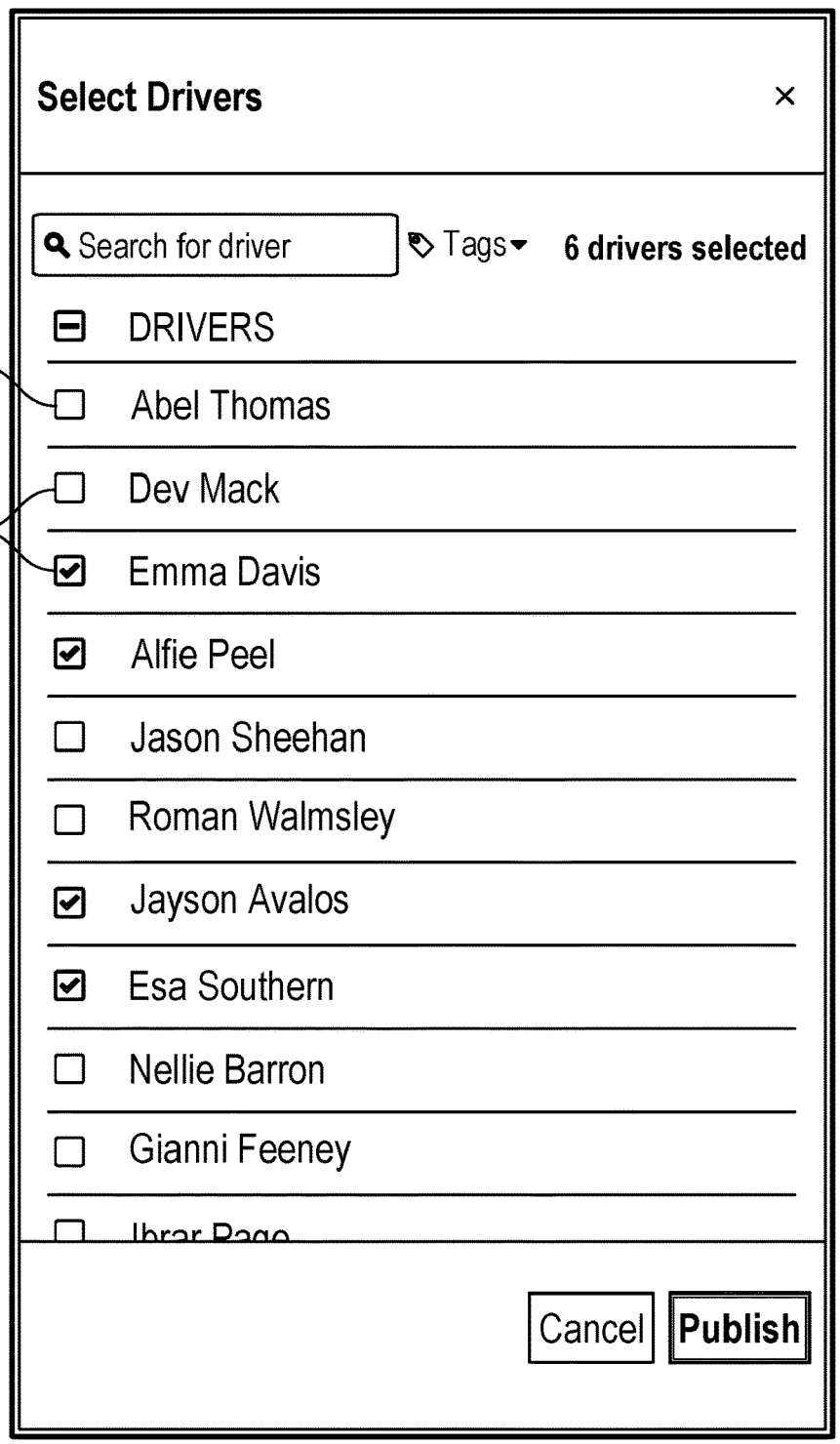
Figure 7C:
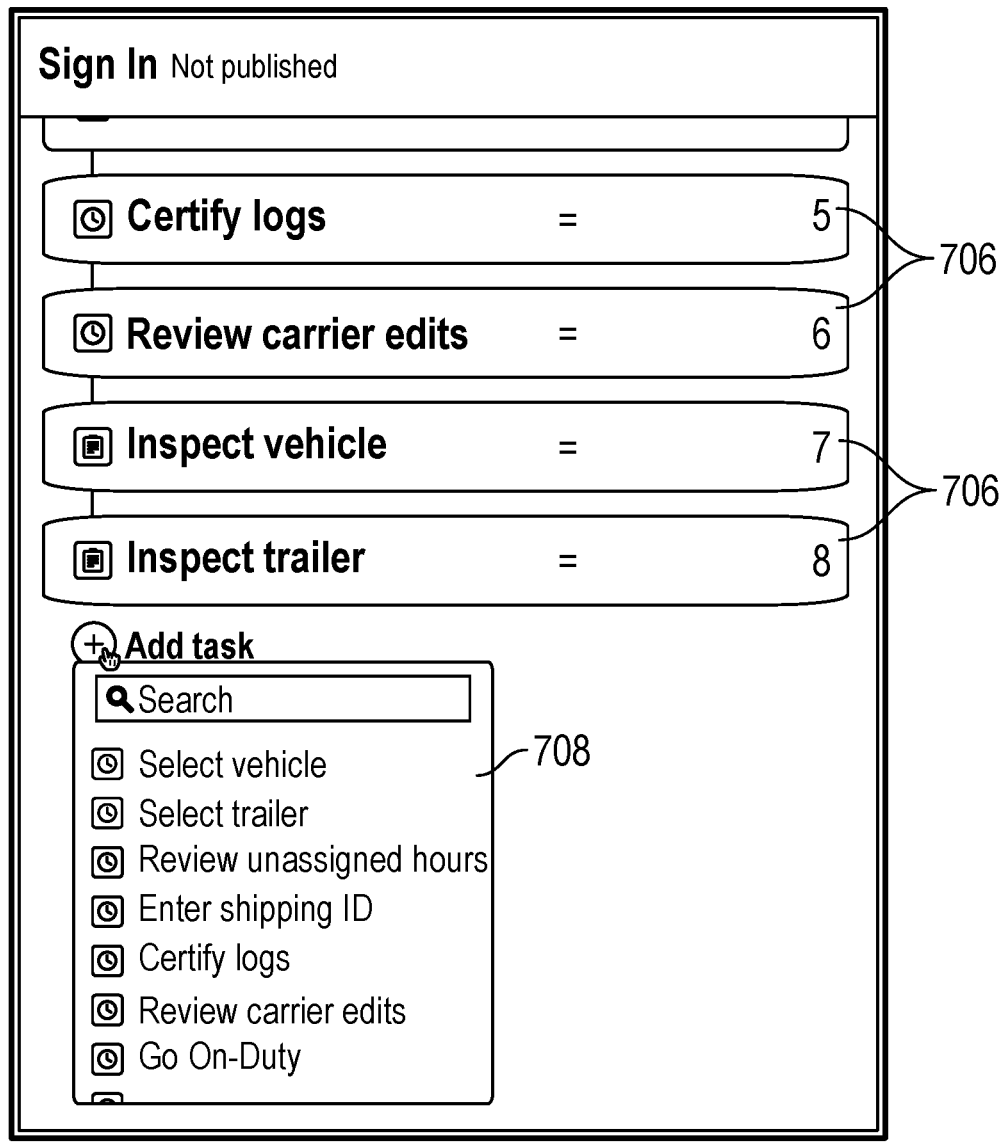

FIGS. 7A-7C show a user interface 700 for generating a vehicle operator workflow, according to some example embodiments. As shown in FIG. 7A, the user interface 700 presents a listing of vehicle operators from which an administrator may select to associate with a vehicle operator workflow. For example, the administrator may select checkboxes 702 presented next to the listed names to select the corresponding vehicle operator.

As shown in FIG. 7B, the user interface 700 may present the different vehicle operator workflows generated by the administrator. For example, the user interface 700 shows a vehicle operator workflow 704 that is associated with a triggering event of signing on. An administrator may select the vehicle operator workflow 704 to further edit, modify or manage the vehicle operator workflow 704.

FIG. 7C shows the user interface 700 after selection of the vehicle operator workflow 704 by the administrator. As shown, the user interface 700 lists the individual tasks 706 included in the vehicle operator workflow 704. Further, the user interface 700 enables the administrator to add new tasks. For example, the user interface 700 includes a listing of available task 708. The administrator may select from the tasks included in the listing of available tasks 708 to add a new task to the vehicle operator workflow 704.

Figure 8A:
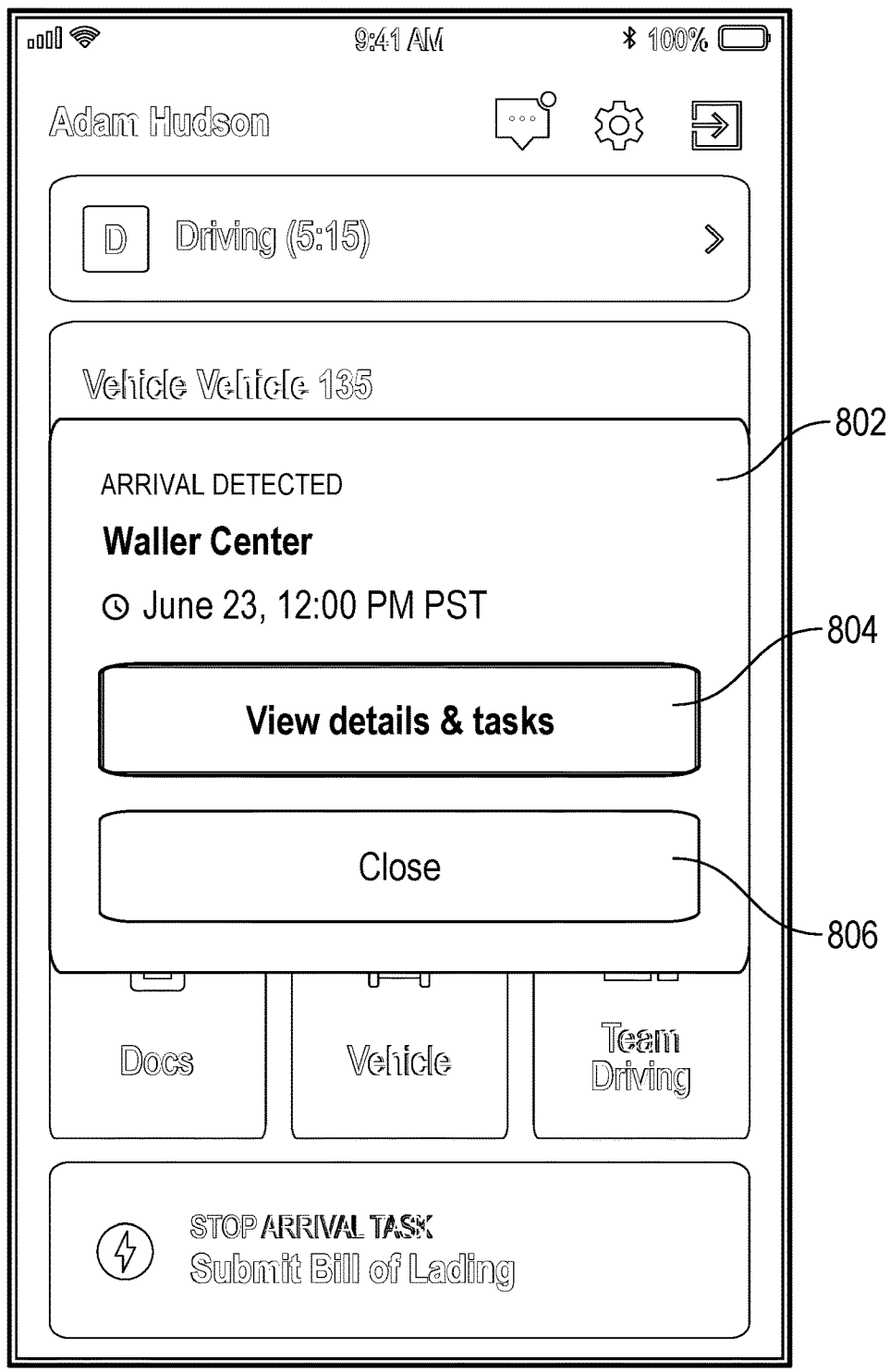
FIGS. 8A-8F show a user interface presenting a vehicle operator workflow, according to some example embodiments.

FIGS. 8A-8F show a user interface 800 presenting a vehicle operator workflow, according to some example embodiments. As shown in FIG. 8A, a notification 802 can be presented to a vehicle operator that a vehicle operator workflow has been triggered. The notification 802 includes a user interface element 804 to view the vehicle operator workflow and another user interface element 806 to close the notification 802.

Figure 8B:
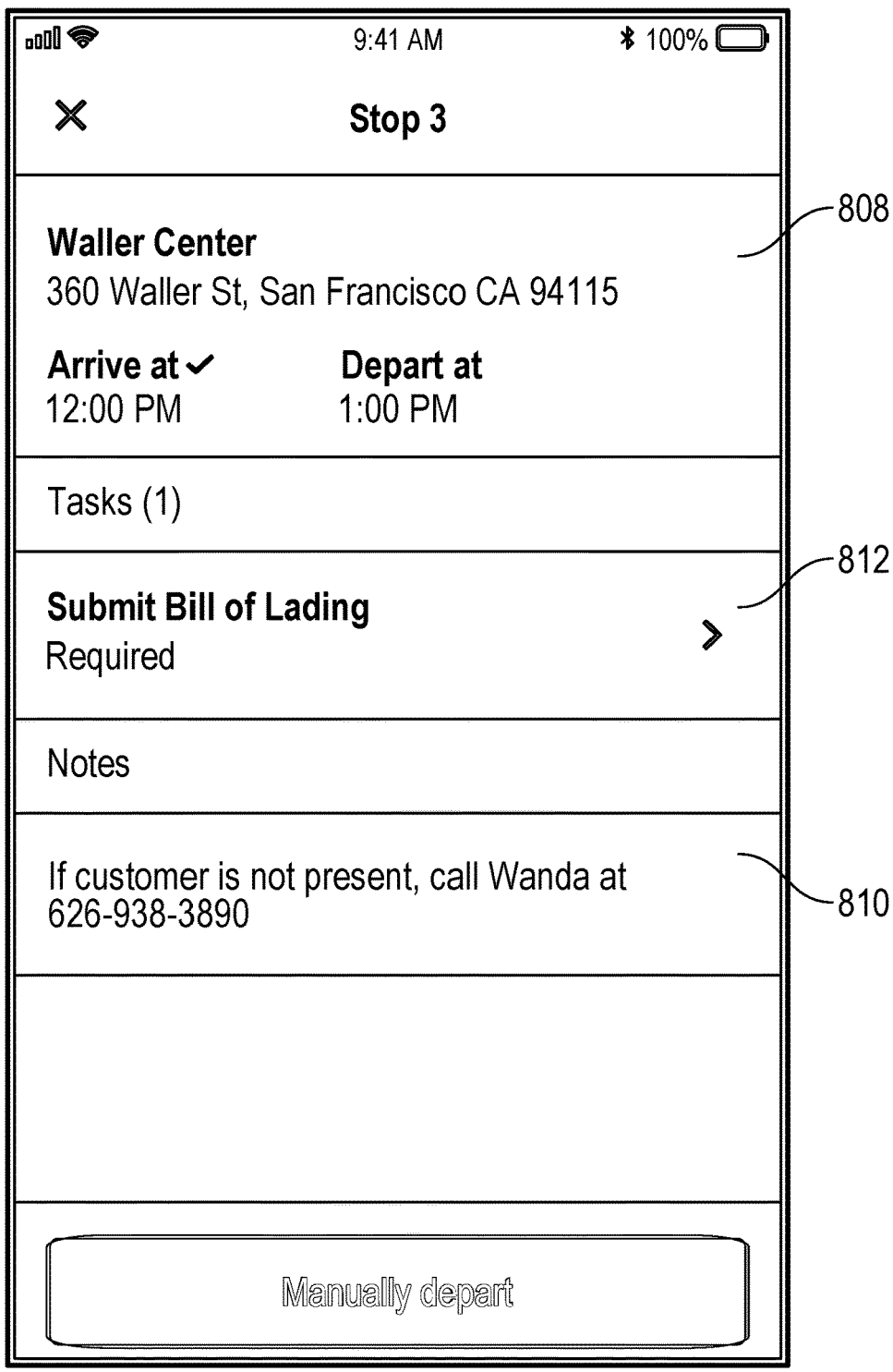

FIG. 8B shows the user interface 800 as a result of the vehicle operator selection the user interface element 804 to view the vehicle operator workflow. As shown, the user interface 800 presents details 808 of the vehicle operator workflow, such as the location, arrival time and expected departure time. The user interface 800 also includes notes 810 added for the vehicle operator. As shown, the notes 810 included contact information to be used by the vehicle operator if the customer is not present.

The user interface 800 also includes a task 812 that is to be completed. As shown, the task 812 is to submit a bill of landing. The user interface indicates that the task 812 is required (e.g., not completed). The vehicle operator may select the shown task 812 to access additional details and/or complete the task 812.

Figure 8C:
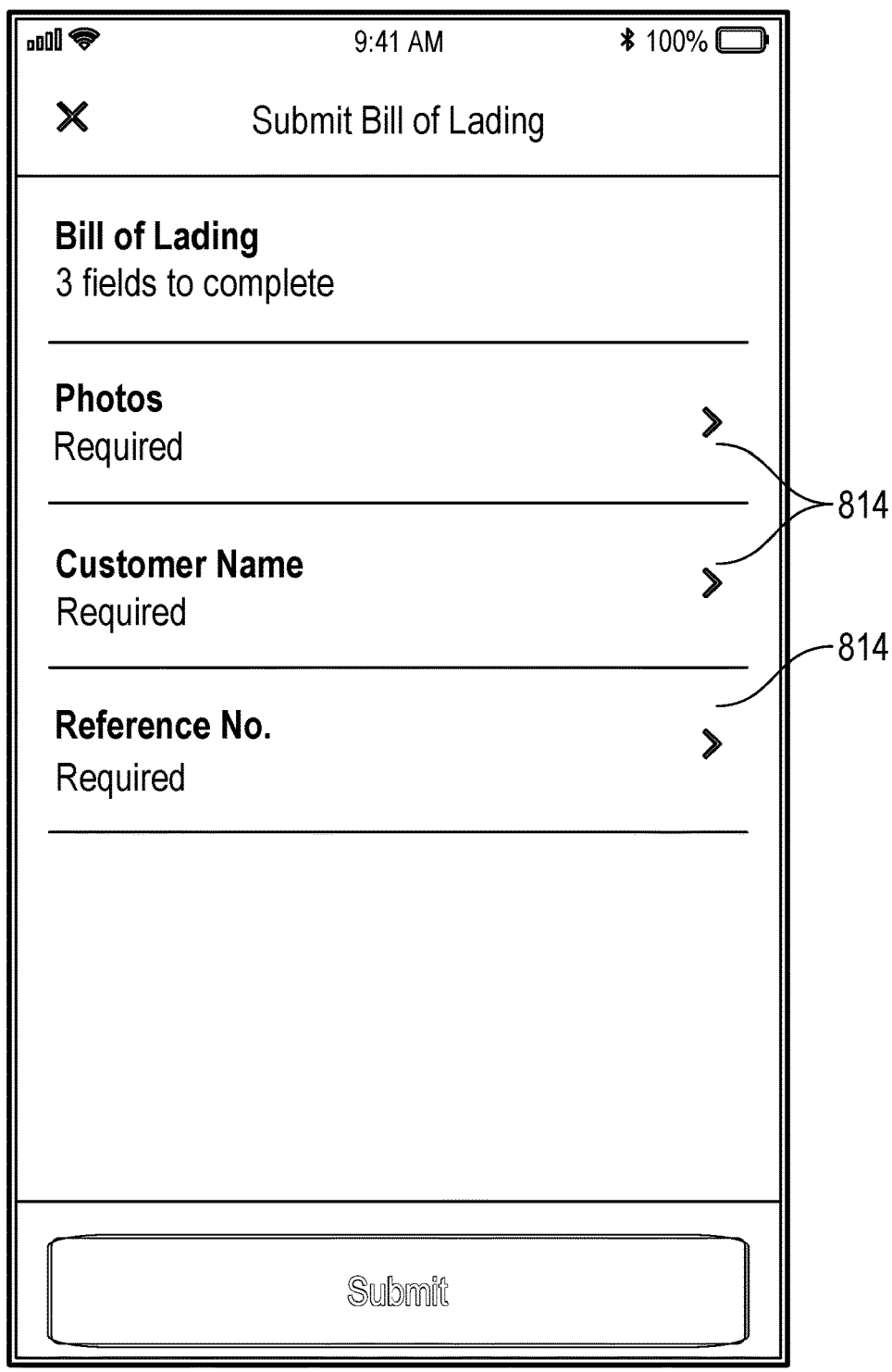

FIG. 8C shows the user interface 800 after the vehicle operator has selected the task 812. As shown, the user interface 800 presents subtasks 814 for completing the task 812. The subtasks 814 includes capturing photos, providing the customer name, and providing a reference no. The vehicle operator may use the user interface to complete each subtask 814, such as by capturing photos and entering the requested data. The user interface 800 indicates that the subtasks 814 are required (e.g., not completed).

Figure 8D:
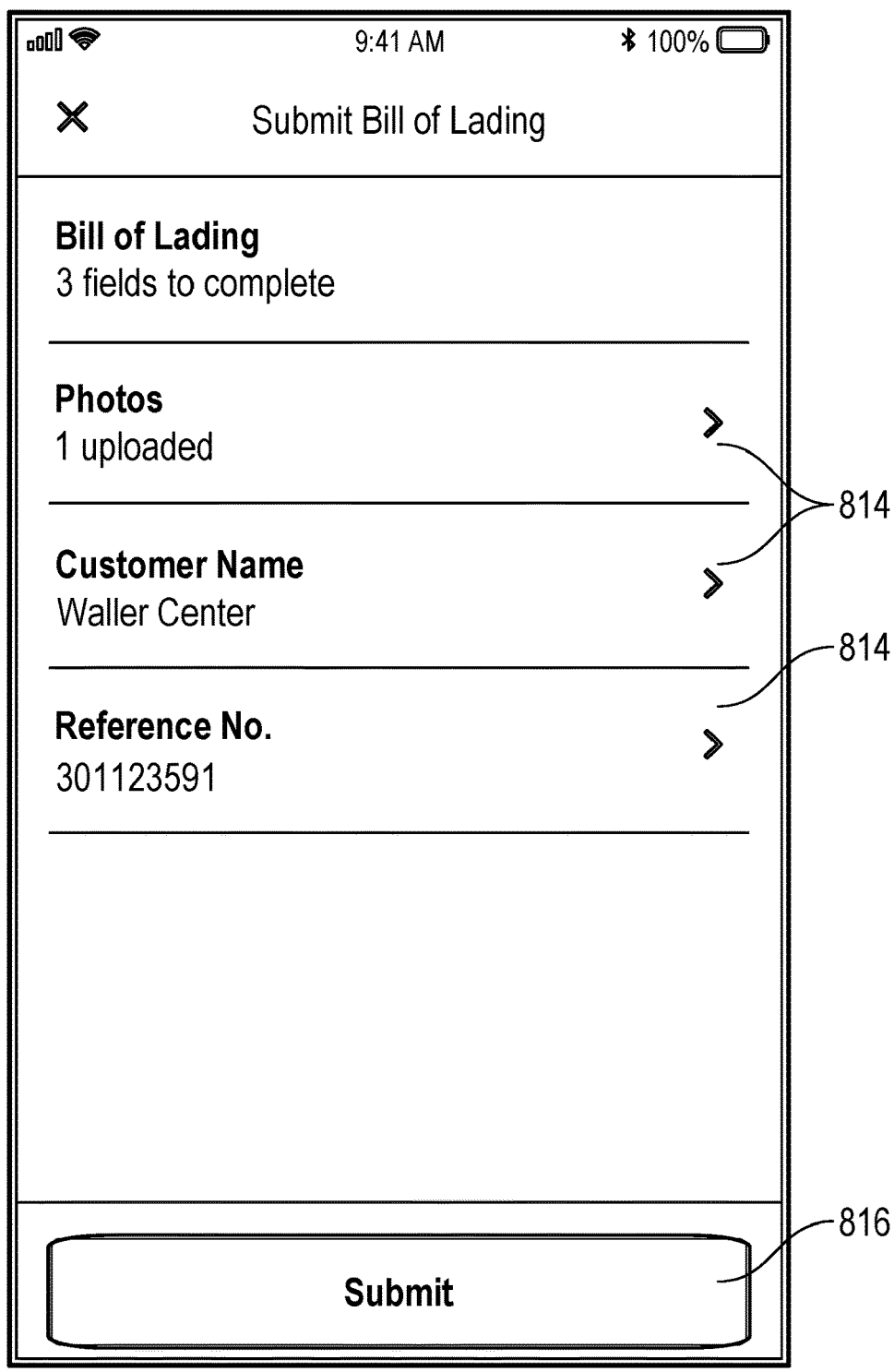

FIG. 8D shows the user interface 800 after a vehicle operator has completed the subtasks 814. As shown, the user interface indicates that a photo has been uploaded and includes the customer name and references number. The user interface 800 no longer indicates that the subtasks 814 are required, indicating that they have been completed. The vehicle operator may select the submit button 816 to indicate that the task 812 has been completed.

Figure 8E:
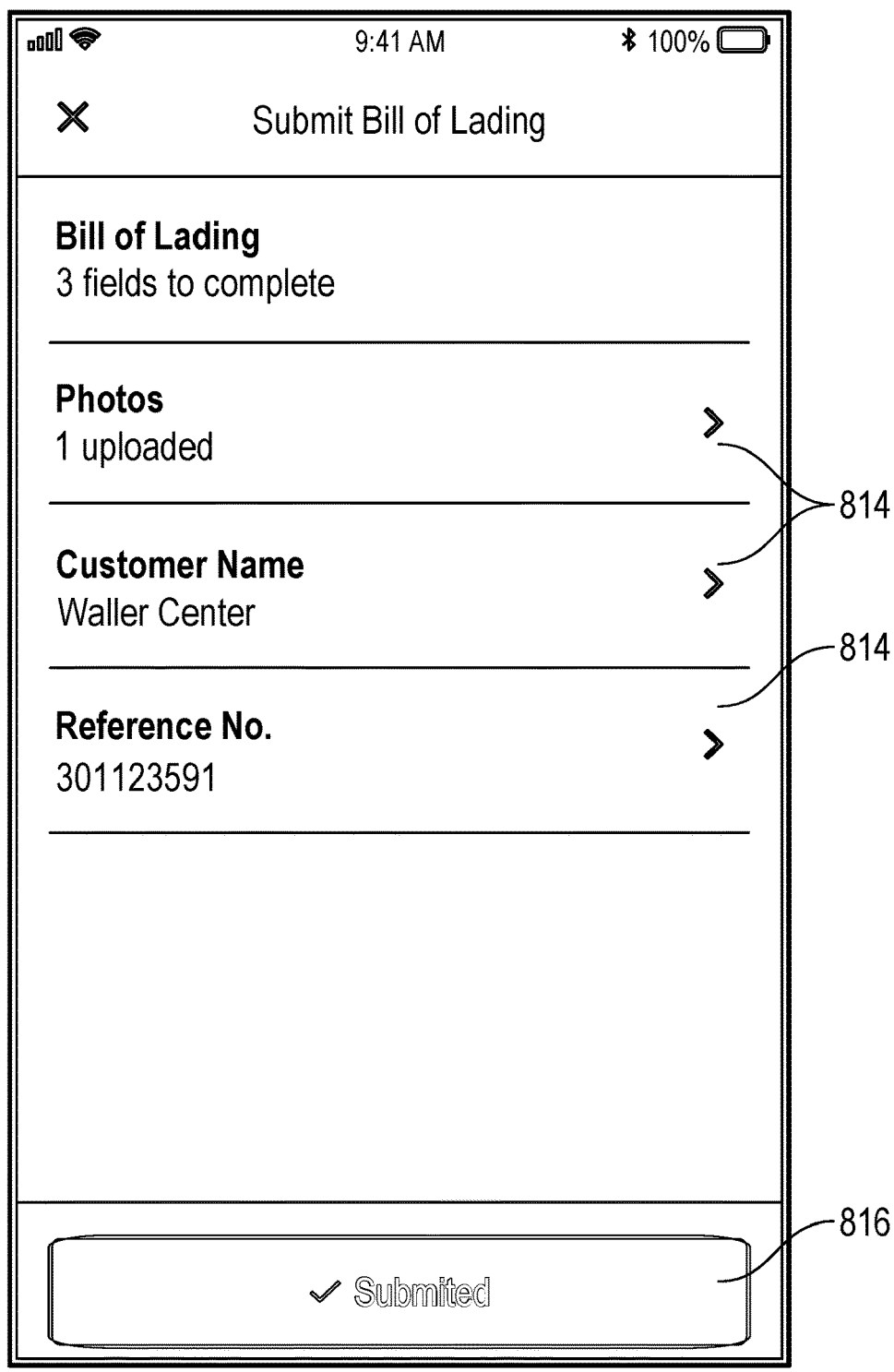

FIG. 8E shows the user interface 800 after the vehicle operator has selected the submit button 816. As shown, the submit button 816 indicates that the information and images requested in the subtasks 814 have been submitted.

Figure 8F:
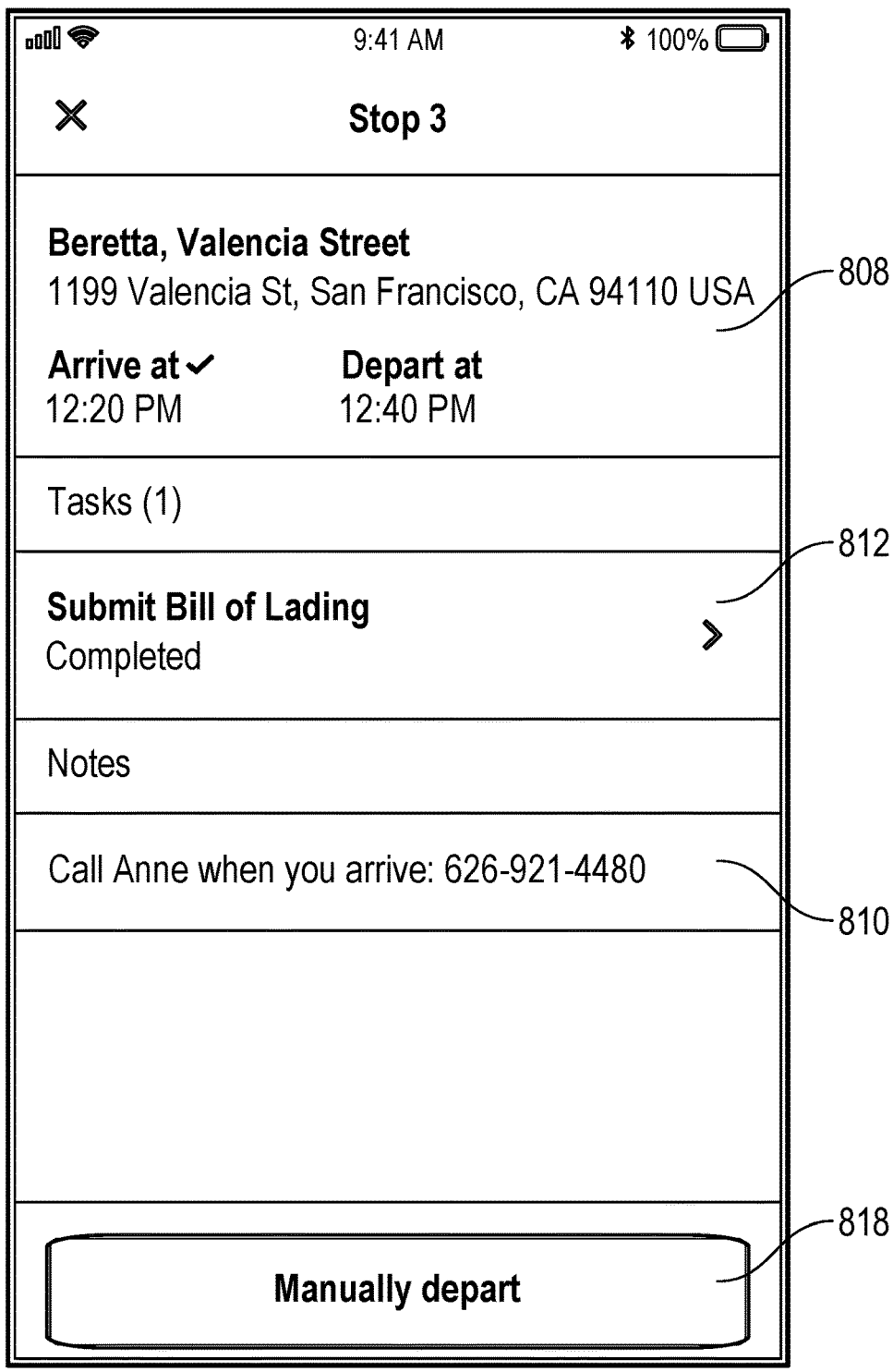

FIG. 8F shows the user interface after the vehicle operator has completed the task 812. The user interface indicates that the task 812 is now completed). The vehicle operator may select the manually depart button 818 to indicate that the vehicle operator is ready to depart.

Software Architecture

Figure 9:
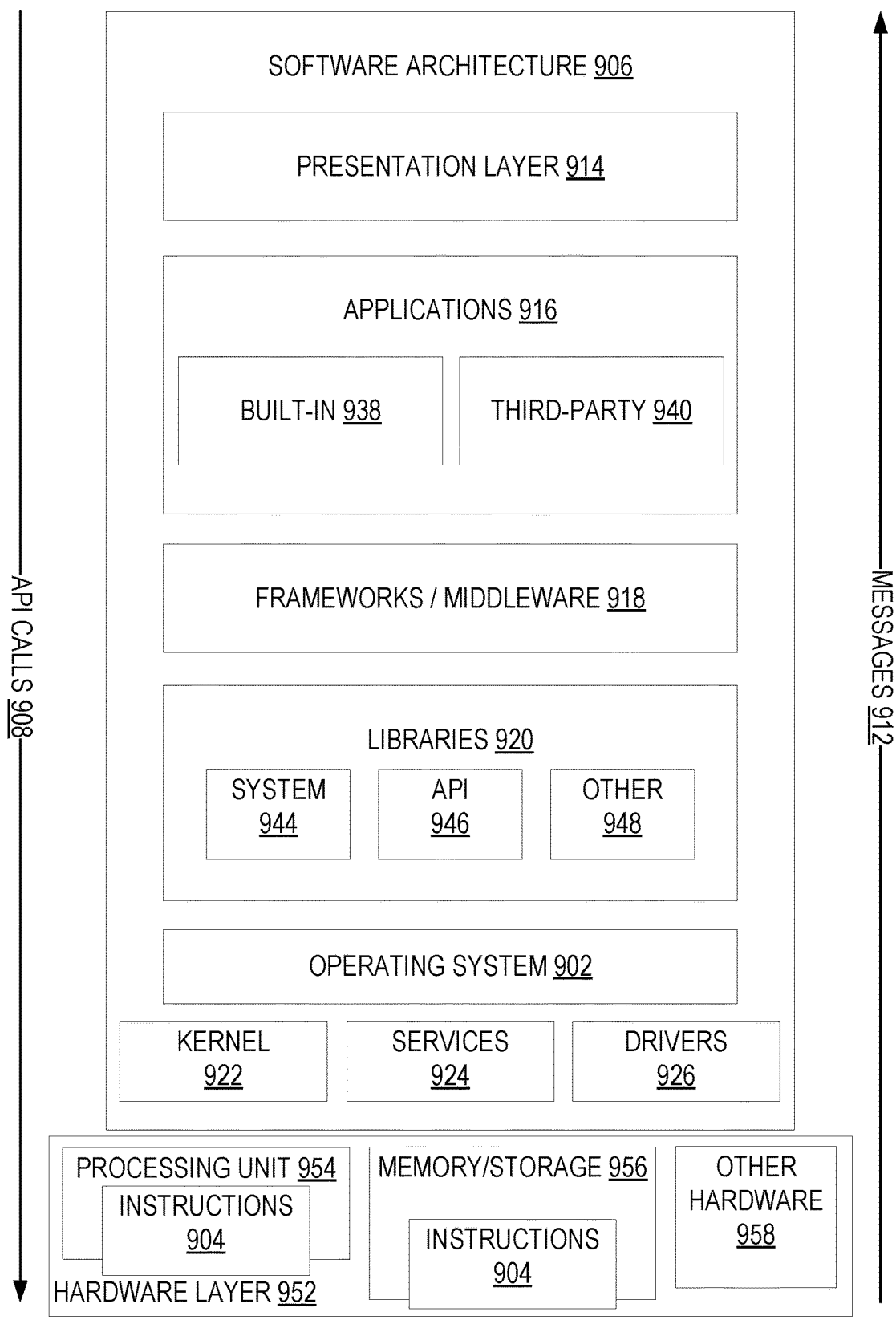
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
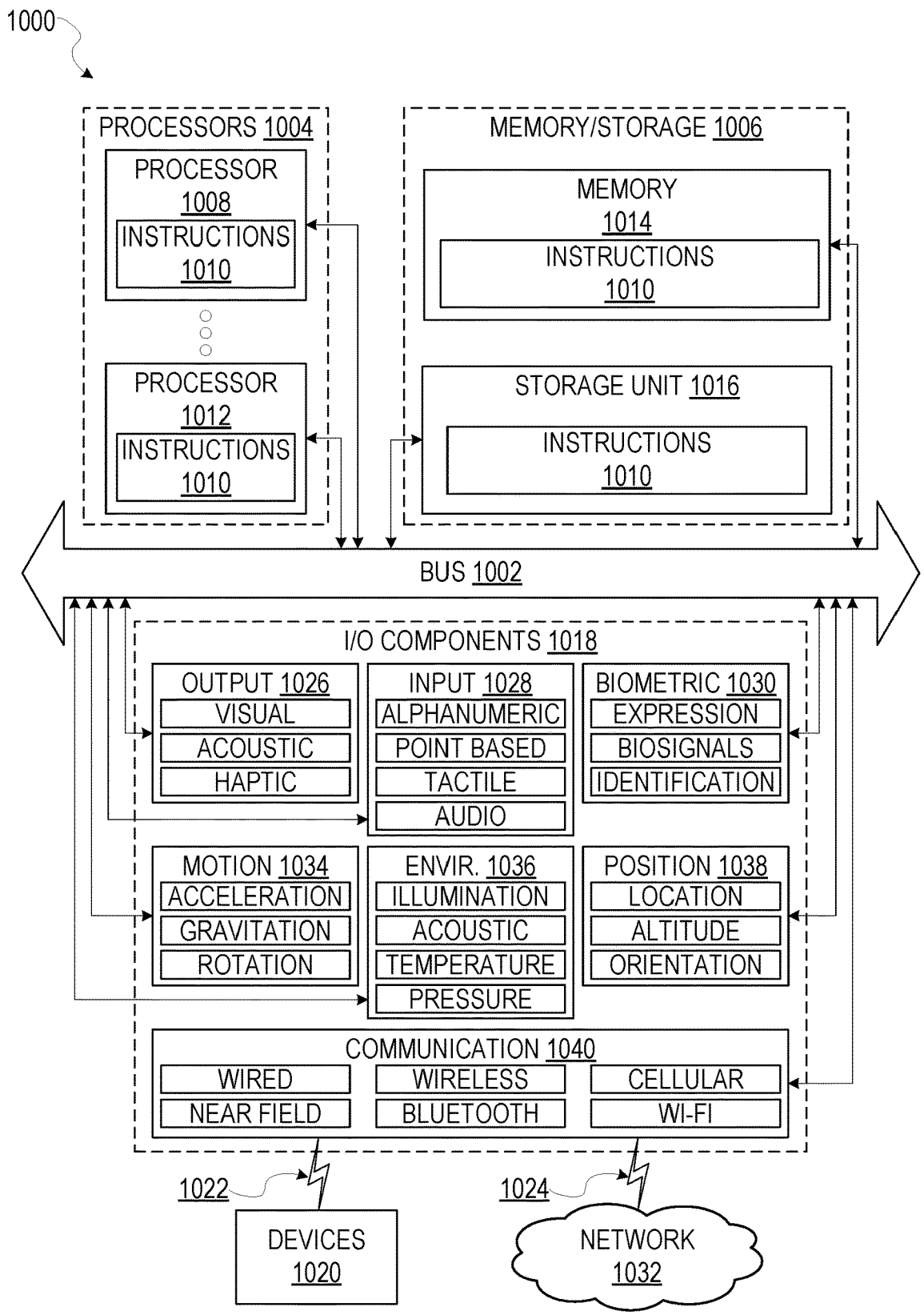
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   receiving, by a workflow management system, data defining a vehicle operator workflow, the data received from a first client device that is remote to the workflow management system, the vehicle operator workflow including an identifier for a vehicle and defining a first task to be performed by an operator of the vehicle based on the operator of the vehicle logging into an account of the workflow management system, and a second task to be performed by the operator of the vehicle based on a geofence encompassing a geographic checkpoint along a designated route to be traveled by the vehicle;
   detecting that the operator of the vehicle logged into the account of the workflow management system;
   in response to detecting that the operator of the vehicle logged into the account, accessing the vehicle operator workflow corresponding to the vehicle and causing presentation of the first task to be performed by the operator of the vehicle on a display of a second client device associated with the identifier for the vehicle, the second client device being remote to the first client device and the workflow management system;
   determining, based on sensor data describing a current location of the vehicle, that the vehicle is within the geofence encompassing the geographic checkpoint along the designated route to be traveled by the vehicle; and
   in response to determining that the vehicle is within the geofence, causing presentation of the second task to be performed by the operator of the vehicle on the display.

2. The method of claim 1, further comprising:
   in response to detecting an input selecting the first task presented on the display of the second client device, executing a deep link to a third-party application on the second client device;
   determining that the first task has been completed by the operator of the vehicle through use of the third-party application; and
   causing presentation that the first task has been completed on the display of the second client device.

3. The method of claim 1, further comprising:
   receiving a first content item providing evidence that the first task has been completed by the operator of the vehicle; and
   generating a report based on the first content item.

4. The method of claim 3, further comprising:
   receiving a second content item providing evidence that the second task has been completed by the operator of the vehicle, wherein the report is further generated based on the second content item.

5. The method of claim 1, wherein the vehicle operator workflow defines a third task to be performed by the operator of the vehicle based on a second geofence encompassing a second geographic checkpoint along a designated route to be traveled by the vehicle.

6. The method of claim 5, further comprising:
determining, based on sensor data describing an updated location of the vehicle, that the vehicle is within the second geofence encompassing the second geographic checkpoint along the designated route to be traveled by the vehicle; and
in response to determining that the vehicle is within the second geofence, accessing the vehicle operator workflow corresponding to the vehicle and causing presentation of the third task to be performed by the operator of the vehicle on the display of the second client device.

7. The method of claim 1, further comprising:
detecting that an operator of a second vehicle logged into a second account of the workflow management system; and
in response to detecting that the operator of the second vehicle logged into the second account, accessing a second vehicle operator workflow corresponding to the second vehicle and causing presentation of a task to be performed by the operator of the second vehicle on a display of a third client device associated with an identifier for the second vehicle that is defined in the second vehicle operator workflow.

8. A workflow management system comprising:
one or more computer processors; and
one or more non-transitory computer-readable mediums storing instruction that, when executed by the one or more computer processors, cause the system to perform operations comprising:
receiving, from a first client device that is remote to the workflow management system, data defining a vehicle operator workflow, the vehicle operator workflow including an identifier for a vehicle and defining a first task to be performed by an operator of the vehicle based on the operator of the vehicle logging into an account of the workflow management system, and a second task to be performed by the operator of the vehicle based on a geofence encompassing a geographic checkpoint along a designated route to be traveled by the vehicle;
detecting that the operator of the vehicle logged into the account of the workflow management system;
in response to detecting that the operator of the vehicle logged into the account, accessing the vehicle operator workflow corresponding to the vehicle and causing presentation of the first task to be performed by the operator of the vehicle on a display of a second client device associated with the identifier for the vehicle, the second client device being remote to the first client device and the workflow management system;
determining, based on sensor data describing a current location of the vehicle, that the vehicle is within the geofence encompassing the geographic checkpoint along the designated route to be traveled by the vehicle; and
in response to determining that the vehicle is within the geofence, accessing the vehicle operator workflow corresponding to the vehicle and causing presentation of the second task to be performed by the operator of the vehicle on the display.

9. The workflow management system of claim 8, the operations further comprising:
in response to detecting an input selecting the first task presented on the display of the second client device, executing a deep link to a third-party application on the second client device;
determining that the first task has been completed by the operator of the vehicle through use of the third-party application; and
causing presentation that the first task has been completed on the display of the second client device.

10. The workflow management system of claim 8, the operations further comprising:
receiving a first content item providing evidence that the first task has been completed by the operator of the vehicle; and
generating a report based on the first content item.

11. The workflow management system of claim 10, the operations further comprising:
receiving a second content item providing evidence that the second task has been completed by the operator of the vehicle, wherein the report is further generated based on the second content item.

12. The workflow management system of claim 8, wherein the vehicle operator workflow defines a third task to be performed by the operator of the vehicle based on a second geofence encompassing a second geographic checkpoint along a designated route to be traveled by the vehicle.

13. The workflow management system of claim 12, the operations further comprising:
determining, based on sensor data describing an updated location of the vehicle, that the vehicle is within the second geofence encompassing the second geographic checkpoint along the designated route to be traveled by the vehicle; and
in response to determining that the vehicle is within the second geofence, accessing the vehicle operator workflow corresponding to the vehicle and causing presentation of the third task to be performed by the operator of the vehicle on the display.

14. The workflow management system of claim 8, the operations further comprising:
detecting that an operator of a second vehicle logged into a second account of the workflow management system; and
in response to detecting that the operator of the second vehicle logged into the second account, accessing a second vehicle operator workflow corresponding to the second vehicle and causing presentation of a task to be performed by the operator of the second vehicle on a display of a third client device associated with an identifier for the second vehicle that is defined in the second vehicle operator workflow.

15. A non-transitory computer-readable medium storing instruction that, when executed by one or more computer processors of a workflow management system, cause the workflow management system to perform operations comprising:
receiving, from a first client device that is remote to the workflow management system, data defining a vehicle operator workflow, the vehicle operator workflow including an identifier for a vehicle and defining a first task to be performed by an operator of the vehicle based on the operator of the vehicle logging into an account of the workflow management system, and a second task to be performed by the operator of the vehicle based on a geofence encompassing a geographic checkpoint along a designated route to be traveled by the vehicle;

detecting that the operator of the vehicle logged into the account of the workflow management system;

in response to detecting that the operator of the vehicle logged into the account, accessing the vehicle operator workflow corresponding to the vehicle and causing presentation of the first task to be performed by the operator of the vehicle on a display of a second client device associated with the identifier for the vehicle, the second client device being remote to the first client device and the workflow management system;

determining, based on sensor data describing a current location of the vehicle, that the vehicle is within the geofence encompassing the geographic checkpoint along the designated route to be traveled by the vehicle; and in response to determining that the vehicle is within the geofence, accessing the vehicle operator workflow corresponding to the vehicle and causing presentation of the second task to be performed by the operator of the vehicle on the display.

16. The non-transitory computer-readable medium of claim 15, the operations further comprising:

in response to detecting an input selecting the first task presented on the display of the second client device, executing a deep link to a third-party application on the second client device;

determining that the first task has been completed by the operator of the vehicle through use of the third-party application; and causing presentation that the first task has been completed on the display of the second client device.

17. The non-transitory computer-readable medium of claim 15, the operations further comprising:

receiving a first content item providing evidence that the first task has been completed by the operator of the vehicle; and generating a report based on the first content item.

18. The non-transitory computer-readable medium of claim 17, the operations further comprising:

receiving a second content item providing evidence that the second task has been completed by the operator of the vehicle, wherein the report is further generated based on the second content item.

19. The non-transitory computer-readable medium of claim 15, wherein the vehicle operator workflow defines a third task to be performed by the operator of the vehicle based on a second geofence encompassing a second geographic checkpoint along a designated route to be traveled by the vehicle.

20. The non-transitory computer-readable medium of claim 19, the operations further comprising:

determining, based on sensor data describing an updated location of the vehicle, that the vehicle is within the second geofence encompassing the second geographic checkpoint along the designated route to be traveled by the vehicle; and in response to determining that the vehicle is within the second geofence, accessing the vehicle operator workflow corresponding to the vehicle and causing presentation of the third task to be performed by the operator of the vehicle on the display.

* * * * *